United States Patent [19]

Luciani

[11] Patent Number: 4,794,493

[45] Date of Patent: Dec. 27, 1988

[54] HEADLIGHT HAVING TWO TRANSVERSE FILAMENTS FOR A MOTOR VEHICLE

[75] Inventor: Bernard Luciani, Paris, France

[73] Assignee: Cibie Projecteurs, France

[21] Appl. No.: 80,634

[22] Filed: Jul. 31, 1987

[30] Foreign Application Priority Data

Aug. 4, 1986 [FR] France ................................ 8611265

[51] Int. Cl.[4] ................................ B60Q 1/00

[52] U.S. Cl. ................................ 362/61; 362/80; 362/299; 362/309

[58] Field of Search ................ 362/61, 307, 351, 317, 362/80, 309

[56] References Cited

U.S. PATENT DOCUMENTS

| | | | |
|---|---|---|---|
| 4,246,631 | 1/1981 | Drapu et al. | 362/299 X |
| 4,303,965 | 12/1981 | Vile et al. | 362/61 |
| 4,520,433 | 5/1985 | Kosmatka | 362/80 |
| 4,685,036 | 8/1987 | Loewe et al. | 362/61 |
| 4,686,610 | 8/1987 | Cibie et al. | 362/61 |

FOREIGN PATENT DOCUMENTS

| | | |
|---|---|---|
| 1309130 | 10/1962 | France . |
| 1319105 | 1/1963 | France . |

*Primary Examiner*—Larry Jones
*Attorney, Agent, or Firm*—McCormick, Paulding & Huber

[57] ABSTRACT

The invention provides a motor vehicle main beam and dipped beam headlight of the type comprising: a lamp provided with a transverse horizontal dipped beam filament (10*a*) and a transverse horizontal main beam filament (10*b*), said filaments being offset relative to each other in two directions perpendicular to the axis of the headlight; a reflector (20) whose axis (Ox) passes between the two filaments; and a closure glass (30) including members for deflecting the dipped beam and the main beam sideways; the headlight being arranged so that the dipped beam is situated beneath a cutoff (Hh) whose orientation is generally horizontal. According to the invention the surface of the reflector is a surface without discontinuity forming shallow images of the dipped beam filament and of the main beam filament, with all of the points in the images of the dipped beam filament additionally being situated beneath said horizontal cutoff (Hh). The invention is applicable to making main beam and dipped beam headlights that satisfy the requirements of the regulations in force in the United States of America.

7 Claims, 3 Drawing Sheets

HEADLIGHT HAVING TWO TRANSVERSE FILAMENTS FOR A MOTOR VEHICLE

The present invention relates to a headlight for a motor vehicle, the headlight serving both as a dipped beam headlight and as a main beam headlight.

It relates more particularly to a headlight in which the dipped light beam is situated below a cutoff defined by two horizontal half-planes which are slightly offset in height relative to each other.

BACKGROUND OF THE INVENTION

This type of cutoff which is described, for example, in French Pat. No. FR-A-2 087 317, is particularly suitable for a dipped beam as required, for example, in the United States of America and as defined by standard SAEJ 579 C.

In order to satisfy this standard, the profile of the cutoff on a standardized projection screen is defined approximately by two horizontal half-lines situated on either side of the headlight axis, with the right-hand side half-line being at horizon level and the left-hand side half-line being offset by about 1.5% below the horizon. In addition, the region of maximum illumination (concentration spot) must be offset towards the right relative to the headlight axis.

The main light beam must have a concentration spot which is approximately centered on the travel axis.

In the prior art, main and dipped beam headlights of this type generally include a lamp having two horizontal filaments which are transversely disposed relative to the headlight axis and which are offset from each other in two directions perpendicular to the headlight axis, i.e. both sideways and vertically.

The associated reflector generally includes a reflecting surface in the form of a paraboloid of revolution whose focus in situated level with the two filaments and halfway between them in a vertical direction. Thus, it is possible to obtain a dipped beam which is situated for the most part beneath a horizontal cutoff and which has a concentration spot which is centered approximately on the travel axis.

However, a non-negligible residual portion of the beam is situated above the cutoff and requires the headlight glass to include deflector prisms or ribs of considerable thickness, thereby giving rise to molding difficulties, particularly when the glass is literally made of glass. In addition, the edges of the prisms are liable to give rise to parasitic light rays which are upwardly directed and which may dazzle oncoming drivers.

Further, since it is desirable for the light beam to be of small thickness in a vertical direction prior to passing through the closure glass, still for the purpose of avoiding the need to provide very thick vertical-deflection stripes in the deflector glass, a parabolic reflector is used whose focal length is relatively long. However, increasing the focal length of a reflector of given outline considerably reduces the amount of light flux emitted from the filaments which is recovered by the reflector, i.e. leads to a reduction in light yield.

The present invention seeks to mitigate the drawbacks of the prior art and to provide a main beam and dipped beam headlight in which no or substantially no vertical deflection of the light rays needs to be performed by the closure glass, and in which the beam that is obtained satisfies the photometric conditions required, in particular, by the United States. Another aim of the present invention is to obtain light beams which are relatively thin prior to passing through the closure glass, without, however, greatly reducing the light yield from the headlight.

SUMMARY OF THE INVENTION

To this end, the invention provides a motor vehicle main beam and dipped beam headlight of the type comprising: a lamp provided with a transverse horizontal dipped beam filament and a transverse horizontal main beam filament, said filaments being offset relative to each other in two directions perpendicular to the axis of the headlight; a reflector whose axis passes between the two filaments; and a closure glass including elements for deflecting the dipped beam and the main beam sideways; the headlight being arranged so that the dipped beam is situated beneath a cutoff whose orientation is generally horizontal, the headlight including the improvement whereby the surface of the reflector is a surface without discontinuity forming shallow images of the dipped beam filament and of the main beam filament, with all of the points in the images of the dipped beam filament additionally being situated beneath said horizontal cutoff.

BRIEF DESCRIPTION OF THE DRAWINGS

The invention will be better understood from reading the following detailed description of preferred embodiments thereof, given by way of example and with reference to the accompanying drawings, in which.

DESCRIPTION OF PREFERRED EMBODIMENTS

Figure 1:
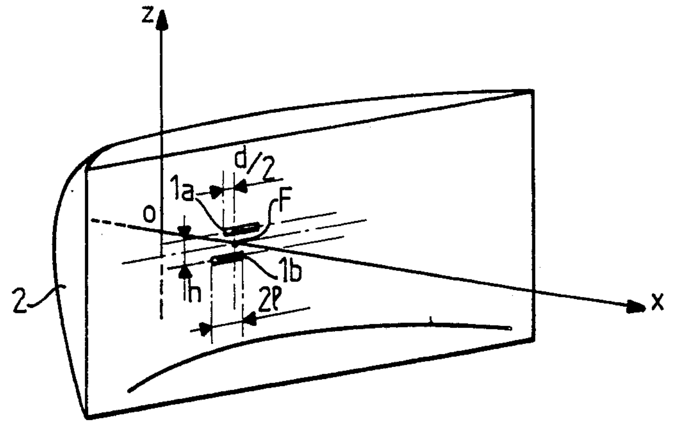
FIG. 1 is a diagrammatic perspective view of a prior art main beam and dipped beam headlight having two filaments, with the closure glass being removed.

FIG. 1 shows a prior art main beam and dipped beam headlight for selectively providing a dipped beam and a main beam in compliance with the regulations currently in force, in particular in the United States of America. It includes a lamp having two filaments 1*a* and 1*b* which are disposed horizontally and transversely to the axis Ox of the headlight. The dipped beam headlight 1*a* is offset upwardly from the axis Ox by a distance h/2 and is offset sideways so that its free end shown to the left in the figure is situated at a distance d/2 from the vertical plane xOz passing through the axis Ox. Each filament is of length 2 l and the filaments 1*a* and 1*b* have respective diameters $\phi$a and $\phi$b. The main beam filament 1*b* is disposed symmetrically to the filament 1*a* about the focus F which is situated on the axis Ox, and both filaments lie in the same vertical transverse plane.

In a standardized lamp known under the reference HB1, the above-described parameters have the following numerical values; h=2.3 mm; d=2.4 mm; 2 l=5.0 mm; $\phi a=1.2$ mm; and $\phi b=1.4$ mm.

The prior art headlight also includes a reflector 2 which is constituted by a paraboliod of revolution whose focus F occupies the position shown. Finally, although it has not been shown, the headlight includes a closure glass.

Figure 2:
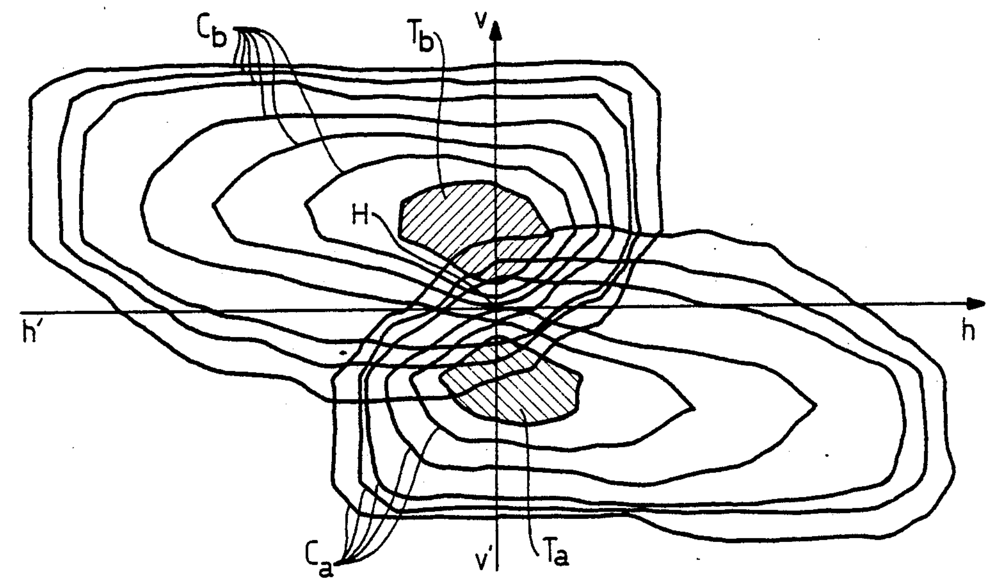
FIG. 2 is a plot of two sets of isocandela curves at infinity representing the dipped beam illumination and the main beam illumination provided by the FIG. 1 headlight without its glass.

FIG. 2 shows two plots of isocandela curves at infinity respectively referenced Ca and Cb, giving the illumination provided when the dipped beam filament and when the main beam filament are switched on individually, with the illumination in each case being that which applies in the absence of the closure glass.

As can be seen, the concentration spot Ta is correctly positioned beneath the cutoff h'Hh and is offset sideways to the right relative to the travel axis (as applicable for driving on the right-hand side of the road). However, there is a considerable overlap of the dipped beam above the right-hand horizontal half-cutoff Hh, in particular to the right of the vertical axis v'Hv. In practice, this leads to the closure glass being provided with deflecting prisms or ribs of considerable thickness, which is disadvantageous since the edges of such thick prisms give rise to light anomalies in the form of parasitic rays leaving the headlight in an upwards direction and liable to dazzle the drivers of oncoming vehicles.

In addition, the main beam which is situated for the most part above the cutoff must also be acted on by the closure glass, in particular to spread it out sideways. Further, its concentration spot is situated somewhat above the horizon h'Hh, which also makes it necessary to deflect the rays slightly downwardly.

Figure 3:
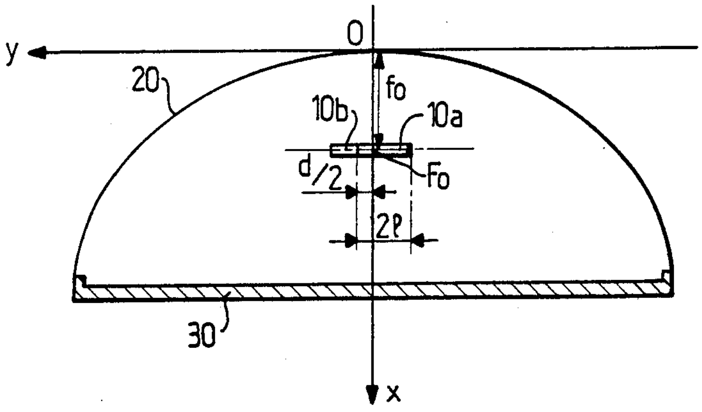
FIG. 3 is a diagrammatic horizontal section through a main beam and dipped beam headlight in accordance with the present invention.
Figure 5:
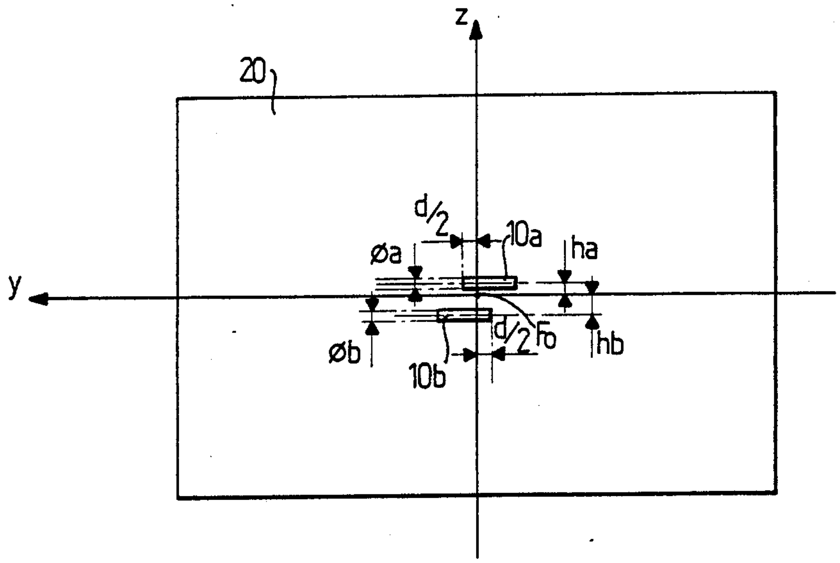
FIG. 5 is a front view of the headlight shown in FIGS. 3 and 4, without its closure glass.
Figure 4:
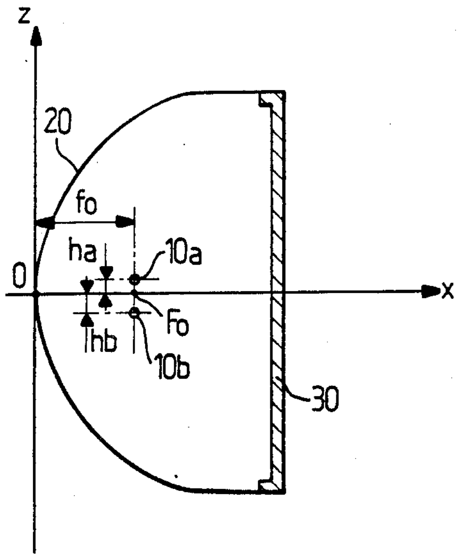
FIG. 4 is a longitudinal vertical section through the FIG. 3 headlight.

A main beam and dipped beam headlight in accordance with the present invention and as shown diagrammatically in figures 3 to 5 comprises a lamp (not shown) having two filaments 10*a* and 10*b* having the same mutual positions as described above, i.e. the same standardized HB1 lamp is used, together with a reflector 20 having an apex O and an axis Ox, and a glass 30 closing the headlight.

As can be seen, the filaments 10*a* and 10*b* no longer occupy symmetrical positions relative to the axis Ox of the reflector 20, instead the lamp is offset vertically so that the axis of the dipped beam filament 10*a* is situated at a distance $h_a$ above the axis Ox, while the axis of the main beam filament 10*b* is situated at a distance $h_b$ beneath the axis Ox, where $h_a<h_b$. If an HB1 lamp as described above is used, then it is preferable for $h_a=0.9$ mm and $h_b=1.4$ mm. It may be observed that the relationship $h_a+h_b=2.3$ mm is retained. The position of the lamp in the transverse direction remains unchanged.

The filaments are disposed in a vertical plane so as to be situated vertically relative to a point $F_0$ situated on the axis Ox. The distance of the reflector apex O from said point $F_0$ is marked $f_0$. Naturally, the positions of the filaments could be different from those specified above, without thereby going beyond the scope of the invention.

The surface of the reflector 20 is a surface without any discontinuities and is selected so as to form images of the dipped beam filament 10*a* which have all of their points lying beneath a horizontal cutoff (marked h'Hh on FIG. 6) passing through the axis of the headlight. Advantageously, the highest points of all of these images lie on the cutoff or very close thereto.

The surface of the reflector 20 is also designed in such a manner that the photometry required for the main beam remains satisfactory, in particular with respect to height (since spreading a centrally concentrated beam sideways does not present any great difficulty in practice).

The term "absence of discontinuity" is used to mean that first order continuity is ensured at any point on the surface of the reflector, and that second order continuity is ensured at any point on the surface except for two localized defects which are explained below and which appear as very slight kinks in curvature. It is recalled that second order continuity means that the tangential planes at any point on any line drawn on the surface are the same on both sides of the line. In practice, this means that there are no breaks in the surface.

Such a disposition makes it possible to make real surfaces by stamping or injection molding which are very close to the theoretical design surfaces.

Theoretical calculation shows that the surface defined by the following equation in an orthogonal frame of reference (O, x, y, z) as shown in FIGS. 3 to 5 has the specified properties:

$$x=y^2/4f_0+z^2/4f_0Q \qquad (1)$$

where:

$$Q = 1 - \frac{4f_0r(z/|z|) + 2yl(yz/|yz|)}{4f_0^2 + y^2}$$

and:

r=the radius of the dipped beam filament;
l=the half-length of the dipped beam filament; and
$f_0$=the horizontal distance between the centers of the filaments and the plane yOz (i.e. the X co-ordinate of the point $F_0$).

Further, if the radius r of the dipped beam filament is assumed to be very small, the above equation becomes, to a first approximation:

$$x=y^2/4f_0+z^2/4f_0S \qquad (2)$$

where:

$$S = 1 - \frac{2yl(yz/|yz|)}{4f_0^2 + y^2}$$

and still has the specified properties, apart from a slightly more approximate quality in the result obtained.

These surfaces have a parabolic section of focal length $f_0$ in the plane xOy, and they act on the filament images in a manner shown in greater detail below.

Further, it can be shown that the surfaces defined mathematically above are second order continuous with the exception of two localized defects in the vertical xOz plane, where continuity is only ensured to the first order. Thus, there remains a very slight kink in these regions and the kinking may be eliminated in practice by the polishing stages that are conventionally included in the reflector manufacturing process. In addition, these localized defects give rise to substantially no anomalies in the beam obtained.

It can be shown that the specific shape of the reflector 20 gives rise to a completely appropriate distribution of the images of the dipped beam filament 10*a*. In particular, it appears that the highest points of all of the images of this filament are aligned on the half-line Hh, or are situated very close thereto, thereby defining a corresponding half-cutoff of very high quality, and in addition that none of the images of the dipped beam filament extend a long way in the vertical direction. More precisely, it can be shown that the images of the dipped beam filament are of progressively shorter lengths with increasing rotation of their centers from the horizontal towards the vertical (depending on the portion of the reflector giving rise to said images). Thus, prior to passing through the closure glass, the beam which is obtained is advantageously a beam of small thickness; not only is the highest point of each image situated very close to the cutoff hh', but also the lowest point of each image does not extend very far below the cutoff. In particular, this avoids applying too much illumination to the road too close to the vehicle, which is what happens with the large vertical images created by the parabolic reflector of the FIG. 1 headlight.

Further details concerning the formation and disposition of the filament images can be obtained from the Applicant's patent application filed on the same day and entitled "Motor vehicle foglight having a transverse filament", claiming priority from French patent application No. 86 11263, filed Aug. 4, 1986.

Figure 6:
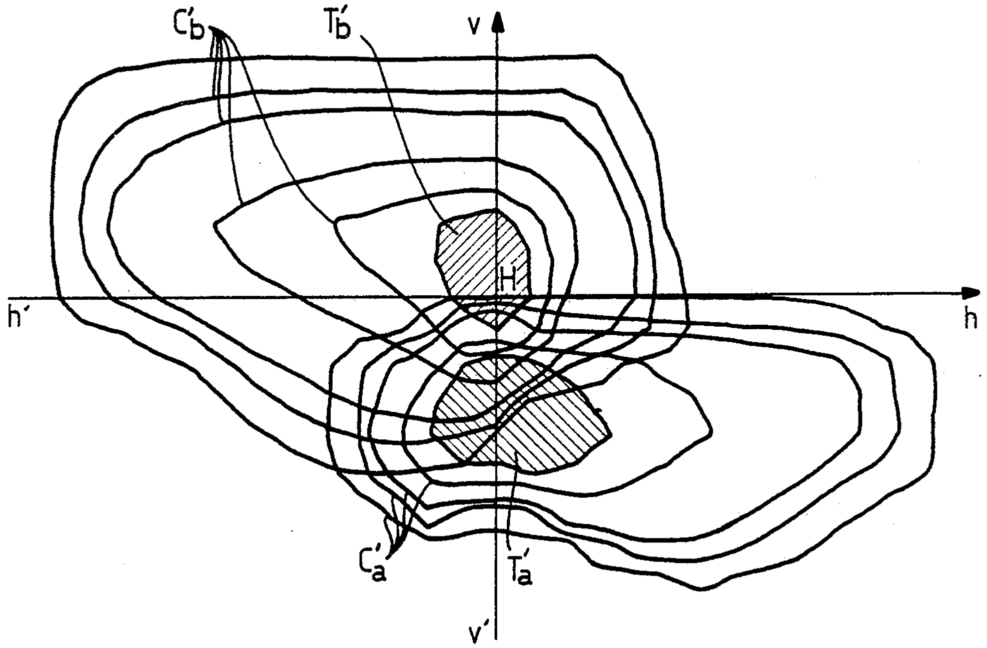
FIG. 6 is a plot of two sets of isocandela curves at infinity showing the dipped beam illumination and the main beam illumination provided by the headlight of FIGS. 3 to 5 without its closure glass.

FIG. 6 is a plot of two sets of isocandela curves $C'_a$ and $C'_b$ whose values decrease going outwardly from the middle, showing the illumination provided by the reflector when co-operating with the dipped beam filament 10*a* and with the main beam filament 10*b*, respectively. In this figure, it can be seen, in particular, that the horizontal half cutoff Hh of the dipped beam is sharp and that the dipped beam is thin, it can also be seen that the concentration spot T'a of the dipped beam is offset slightly to the right and that the concentration spot T'b of the main beam lies on the headlight axis (with the point H lying on said axis).

The closure glass is designed to spread both beams somewhat in a sideways direction. In particular, elements (prisms or ribs) for deflecting the dipped beam concentration spot sideways to the left are provided in order to define the downwardly offset left-hand half-cutoff of this beam. The main beam is also spread sideways in order to make it wider. However, in both cases, given that a degree of spreading is already obtained by the very nature of the reflector, there is no need to provide the closure glass with thick prisms or ribs: as a result the glass is easy to mold regardless of whether it is made of transparent plastic or of glass per se, and in addition the edges of the prisms will not give rise to parasitic rays extending in an upwards direction.

Naturally, the present is not limited to the various embodiments described above and the person skilled in the art can make modifications thereto without going beyond the scope of the invention.

I claim:

1. A motor vehicle main beam and dipped beam headlight comprising a lamp provided with a transverse horizontal dipped beam filament and a transverse horizontal main beam filament, said filaments being offset relative to each other in horizontal and vertical directions perpendicular to the axis of the headlight; a reflector whose axis passes between the two filaments; and a closure glass including members for deflecting the dipped beam and the main beam only substantially sideways, wherein the reflector has a reflecting surface without discontinuity which forms per se a shallow dipped beam situated immediately beneath a horizontal cut-off and which further forms per se a shallow main beam having a bright spot in the vicinity of the headlamp axis.

2. A headlight according to claim 1, wherein the images of the dipped beam filament formed by the reflector all have their highest points aligned on said horizontal cutoff.

3. A headlight according to claim 2, wherein the dipped beam filament is offset upwardly by a distance which is less than the distance by which the main beam filament is offset downwardly relative to the axis of the reflector.

4. A headlight according to claim 3, wherein the surface of the reflector is defined by the equation:

$$x = y^2/4f_0 + z^2/4f_0Q \qquad (1)$$

where:

$$Q = 1 - \frac{4f_0r(z/|z|) + 2yl(yz/|yz|)}{4f_0^2 + y^2}$$

and x,y,z = cartesian co-ordinates, with the axis Ox being the headlight axis;

l = the half-length of the dipped beam filament (10*a*);

r = the radius of the dipped beam filament (10*a*); and $f_0$ = the horizontal distance of the dipped beam filament from the yOz plane.

5. A headlight according to claim 3, wherein the surface of the reflector is defined by the equation:

$$x = y^2/4f_0 + z^2/4f_0S \qquad (2)$$

where:

$$S = 1 - \frac{2yl(yz/|yz|)}{4f_0^2 + y^2}$$

and x,y,z = cartesian co-ordinates, with the axis Ox being the headlight axis;

l = the half-length of the dipped beam filament (10*a*); and $f_0$ = the horizontal distance of the dipped beam filament from the yOz plane.

6. A headlight according to claim 4, wherein the lamp of the headlight is a standardized HB1 lamp.

7. A headlight according to claim 4 wherein the lamp of the headlight is a standardized HB1 lamp and the vertical distance between the axis of the dipped beam filament and the axis of the reflector is about 0.9 mm, and in that the vertical distance between the axis of the main beam filament and the axis of the reflector is about 1.4 mm.

* * * * *